2,989,369

DEACTIVATION OF COLOR FORMING AND FOAM STABILIZING BODIES IN SODIUM CARBONATE PRODUCED FROM TRONA

Roy T. Osborne, Rock Springs, Wyo., assignor to Food Machinery and Chemical Corporation, New York, N.Y., a corporation of Delaware
No Drawing. Filed Jan. 30, 1957, Ser. No. 637,079
7 Claims. (Cl. 23—37)

This invention relates to a method of treating sodium products derived from crude trona. More particularly, this invention relates to a method of treating sodium products derived from crude trona with chlorine or bromine.

In the vicinity of Green River, Wyoming, there is a vast underground deposit of crude trona, the basic component of which is sodium sesquicarbonate, represented by the empirical formula:

$$Na_2CO_3 \cdot NaHCO_3 \cdot 2H_2O$$

Associated with the sesquicarbonate in the crude trona formation are impurities such as sodium chloride, sodium sulfate, iron oxide, shale, and organic matter.

This invention concerns itself primarily with the last named of the impurities, i.e., the organic matter present in the crude trona formation. The origin or cause of the organic matter in crude trona is suspected to be the deposition of certain microorganisms known as *Artemia salina*. The chemical structure of the organics present in the crude trona has not been determined though it is known they are mixtures of chemical compounds capable of being solubilized or dispersed in alkaline liquors and which are not decomposed at temperatures up to about 400° C.

A further source of organic impurity in the sodium products crystallized from crude trona solutions is that of a relatively high molecular weight organic additive which is employed to enhance the crystal growth. A description of the process using said additives as well as an enumeration of the additives found suitable for promoting desirable crystal growth is set forth in U.S. application Serial No. 474,828, Patent No. 2,954,282. During the crystallization of the sodium product, a portion of the organic impurity may be occluded by the crystals.

Both, the naturally occurring organics and the organic additives have color forming and foam stabilizing bodies which deleteriously affect the production of sodium phosphates.

From crude trona may be produced the following sodium compounds: sodium sesquicarbonate, sodium bicarbonate, sodium carbonate monohydrate and sodium carbonate. Although sodium sesquicarbonate, sodium bicarbonate, and sodium carbonate monohydrate are commercially useful in themselves, a vast proportion of these materials is diverted for the purpose of converting same into sodium carbonate by calcination.

Sodium carbonate is produced in this country at the annual rate of approximately six million tons. A large portion of this annual tonnage goes into the manufacture of sodium phosphates; the reaction between phosphoric acid and sodium carbonate yielding the said phosphates.

Sodium phosphates are used extensively by detergent, food, and pharmaceutical manufacturers. In these industries the deactivation of color forming bodies in the phosphate is essential. Since sodium carbonate is a reactant in the preparation of sodium phosphates, color forming bodies present in the sodium carbonate will likewise appear in the sodium phosphates.

Furthermore, when producing sodium phosphates for any end-use, it is imperative for the proper operation of the phosphate plant that there be an absence of excessive foaming during the reaction of the sodium carbonate and phosphoric acid. During the reaction of sodium carbonate, produced from crude trona solutions, and phosphoric acid excessive foaming will occur if the foam stabilizing bodies present in the organics are not deactivated.

By deactivation is meant that the sodium products show a substantial decrease in color forming properties as determined by the reflectance test hereinafter described, and a substantial diminishing of the foam index, said foam index hereafter defined and described.

The extent to which color forming is present in soda ash, may be determined by measuring the percent reflectance of a sample of sodium tripolyphosphate, prepared by reacting phosphoric acid and sodium carbonate. A satisfactory phosphate has a percent reflectance of 90% or above. The foam index is the height in centimeters to which a solution of sodium carbonate will foam when a given percent of phosphoric acid is added to said solution over a period of time. Foam indices above 50 are unsatisfactory.

A process for the production of sodium carbonate from crude trona is through the intermediate step of crystallizing sodium sesquicarbonate from crude trona solutions. Generally stated, the process is as follows: crude trona is dissolved in a cycling mother liquor containing a greater mol ratio of normal carbonate than bicarbonate. The trona solution and suspended insolubles are then passed to a clarifier where a substantial amount of the suspended solids settle out. The overflow from the clarifier is then filtered and the filtrate passed to a series of vacuum crystallizers wherein sodium sesquicarbonate crystallizes out as the stable solid phase. The crystals are separated from the mother liquor by centrifuging from whence they are passed to a calciner wherein they are converted to sodium carbonate. The mother liquor from the crystallizers is returned to the dissolving section to re-initiate the cycle.

For a description of the preparation of sodium bicarbonate from crude trona, see U.S. Patent No. 2,704,329. United States Patent No. 2,775,204 describes a process for the preparation of anhydrous sodium carbonate from crude trona. A process for the preparation of sodium carbonate monohydrate is described in U.S. patent application Serial No. 632,236, filed January 2, 1957.

In the aforementioned processes for producing sodium products from crude trona, organic impurities may be removed either by adsorption, as set forth in U.S. Patent No. 2,346,140, or by high temperature calcination as described in U.S. application Serial No. 601,697, filed August 2, 1956.

The adsorbent method of removing organic impurities requires the use of expensive activated charcoal and elaborate filtering equipment. Similarly, the use of high temperature calcination, while a satisfactory means of removing organic impurities, nevertheless adds a costly step to the process.

It is an object of this invention to produce sodium products from crude trona suitable for use in the preparation of sodium phosphates.

It is a further object of this invention to provide an effective and inexpensive means to deactivate the color forming and foam stabilizing bodies found in the sodium products produced from crude trona.

Further objects will appear to those skilled in the art as the description of this invention unfolds.

Generally stated, this invention involves contacting sodium products containing the organic impurities with chlorine or bromine.

It has been discovered that by reacting the aforementioned organics with chlorine or bromine, the organic impurities are substantially deactivated, which in turn, results in a substantial improvement in the color and foaming characteristics of the sodium products produced from the crude trona.

The deactivation of the organics with chlorine or bromine may be performed prior to the crystallization step by bubbling chlorine or bromine into the crude trona solution or by contacting the sodium product, itself, with chlorine or bromine. It has been found preferable to contact the sodium product with chlorine or bromine.

Accordingly, where the crystallized product is contacted with gaseous chlorine or bromine, the treatment may be performed in a rotary drum or calcining type equipment at temperatures of between about 150° C. to 400° C.

Likewise, the chlorine or bromine may be produced by the decomposition of a metal halide. However, care must be exercised in selecting the metal halide so that the metal introduced into soda ash is not an objectionable impurity.

The deactivation of the color forming and foam stabilizing properties of the sodium products will occur by reacting same with chlorine or bromine at temperatures of about 20° C. and above.

A preferred method of deactivating is to pass chlorine gas and the sodium product through a rotary calciner while maintaining the temperature of the sodium product at about 150°–200° C. This higher temperature allows the reaction between halogen and organics to proceed more rapidly.

Following is an embodiment of the present invention: crude trona containing organic impurities is dissolved in a cycling liquor heated to about 80–100° C. and containing from about 22 to 38 pounds of sodium carbonate and about 1 to 5.8 of sodium bicarbonate/hundred lbs. of water. The solution and suspended solids are passed to a clarifier wherein a large percentage of the suspended insoluble solids settle out. The overflow liquor from the clarifier is passed to a filter where the remaining suspended solids are removed. The clarified solution, at a temperature of between 80° to 100° C., is then passed to a series of three vacuum crystallizers, where it is cooled gradually from 85–100° C. to about 45° C. in successive crystallizers thereby crystallizing sodium sesquicarbonate. The filtrate from the last crystallizer is then returned to the dissolver to begin again the cycling process. The sodium sesquicarbonate crystals are passed to a centrifuge to remove residual liquor before being converted into sodium carbonate by calcination in a rotary calciner at a temperature of between 150°–250° C. The sojourn time of the sesquicarbonate crystals in the calciner is about 30 minutes. During the calcination of the sesquicarbonate crystals gaseous chlorine is passed into the calciner. The calcination of the sodium sesquicarbonate crystals in the presence of chlorine converts the sesquicarbonate into a sodium carbonate having substantially deactivated color forming and foam stabilizing properties.

The amount of chlorine or bromine necessary to deactivate the color and foaming properties of the aforementioned sodium compounds is directly proportional to the amount of organic impurities found present.

Treating the aforementioned sodium compounds having a pre-treatment percent reflectance of 72 and foam index of 52 with 1.8 parts of chlorine per 1000 parts of sodium compound has resulted in an STPP product having a percent reflectance of 91 and a foam index of 30.

As stated previously the deactivation of the color and foaming properties is indicated by an increase in the percent reflectance and a decrease in the foam index.

Reflectance is a measure of the whiteness of sodium tripolyphosphate (STPP) prepared by the interaction of sodium carbonate and phosphoric acid and is measured by a standard means of determining light reflectance. The test employed for the reflectance determinations consisted of grinding 20 to 30 grams of sodium tripolyphosphate in a mortar with a pestle for at least 5 minutes. After the tripolyphosphate had been ground for the stated time it was transferred to a plate glass square. Another plate glass square was placed on top of the sample and the top plate glass was pressed down with the full weight of the body to form a hard smooth surface.

The reflection meter used to measure the whiteness of the samples is standardized by adjusting the sensitivity knobs so that the galvanometer reads 0% on an enamel standard of 72% absolute reflectance and 100% on a freshly scraped magnesium carbonate block.

The glass plate is carefully removed from the top of the sample to be measured and the search unit of the reflectance meter placed on the smooth surface of the sample so as not to disturb the surface. The percent reflectance is then measured to the nearest percent. The grinding and reflectance reading of a sample is repeated until further grinding produces no increase in reflectance. The reflectance values found in Table 1 were the final reflectances so determined.

The foam index is defined as the height in centimeters of the foam caused by the addition of 80 mls. of a 75% phosphoric acid solution over a 4-minute period to a solution of 95 grams of soda ash in 150 mls. of distilled water at 65° C.

The apparatus used in the foam test consisted of a 6.0 cm. bore Pyrex tube, 61 cm. long. A number 12 rubber stopper is cut laterally so that the bottom diameter is 6.3 cm. and the thickness 1.2 cm. A hole is cut in the center of the stopper and a stirring mechanism fitted therein. The stirring shaft has a four-blade stirrer connected thereto.

A three-way T stopcock serves as the column drain and to admit the acid to the column from a 250 ml. burette. Mounted slightly above the four-blade stirrer is a baffle which is constructed by criss-crossing two 16 gage stainless steel plates (1.3 x 5.9 cm.) and welding on 4 legs (16 gage 0.35 x 4.6 cm.) at the outside edges of the plates. A meter stick is mounted adjacent the outside of the column so as to read the foam height.

The foam height of a given sample is dependent upon the rate of acid addition. Greater foam heights are obtained by increasing the acid rate. The optimum acid rate is found to be 20 ml. per minute. Higher rates cause erratic bouncing of the foam.

It has also been found advantageous in determining the foam height to add about 1 p.p.m. of an alkyl benzene sulfonate to the material in the cylinder. This likewise helps to control the sudden surging of the foam height.

Table I shows reflectance measurements of various samples of STPP made from samples of soda ash treated with chlorine according to the teachings of this invention and STPP samples made from non-treated soda ash.

TABLE I

*Reflectance measurements*

| STPP | STPP |
| --- | --- |
| Percent Reflectance Before Chlorination | Percent Reflectance After Chlorination |
| —72 | 95 |
| —72 | 95 |
| —72 | 91 |
| —72 | 93 |
| —72 | 93 |

Clearly shown in Table I is the fact that treatment of the soda ash according to the present invention substantially increases the percent reflectance of the STPP produced from the treated ash, and correspondingly deactivates the color forming properties of the sodium carbonate.

Set forth below in Table II is a test comparison of foam index measurements on both treated and non-treated soda ash.

TABLE II

*Foam index measurements*

| STPP Foam Index Before Chlorination | STPP Foam Index After Chlorination |
|---|---|
| 55 | 30 |
| 54 | 28 |
| 55 | 20 |
| 51 | 24 |
| 52 | 30 |

The results tabulated in Table II clearly show a substantial reduction in the foam index of the sodium carbonate.

The subject invention has provided an economic and technically feasible solution to a problem long vexing soda ash manufacturers.

Pursuant to the requirement of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for treating sodium carbonate produced from crude trona, said untreated sodium carbonate producing a sodium tripolyphosphate with a reflectance of about 72 and said untreated sodium carbonate giving a foam index when mixed with phosphoric acid of about 51 to 55, which comprises contacting solid untreated sodium carbonate with gaseous halogen at temperatures of between about 150° C. and 400° C., said halogen selected from the group consisting of chlorine and bromine, the time of halogenation and the amount of halogen being sufficient to increase the reflectance of sodium tripolyphosphate produced from said treated sodium carbonate to about 91 to 95 and to decrease the foam index of said treated sodium carbonate when mixed with phosphoric acid to about 24 to 30.

2. In the process for producing sodium carbonate produced by calcining sodium products selected from the group consisting of sodium sesquicarbonate, sodium bicarbonate, sodium carbonate monohydrate and sodium carbonate, said sodium products being produced from crude trona, the improvement which comprises contacting said sodium products with chlorine at a temperature between about 150° C. and 400° C. during said calcining, the time of chlorination and the amount of chlorine being sufficient to increase the reflectance of the sodium tripolyphosphate produced from said chlorinated sodium carbonate from less than 90 in the unchlorinated sodium carbonate to at least 90 and to decrease the foam index of said chlorinated sodium carbonate when mixed with phosphoric acid from over 50 in the unchlorinated sodium carbonate to below 50.

3. The process of claim 2 wherein said chlorinating is carried out at a temperature of between 150° C. and 250° C.

4. In the process for producing sodium carbonate produced by calcining sodium products selected from the group consisting of sodium sesquicarbonate, sodium bicarbonate, sodium carbonate monohydrate and sodium carbonate, said sodium products being produced from crude trona, the improvement which comprises contacting said sodium products dissolved in aqueous solution with chlorine prior to calcining said sodium products and thereafter calcining at a temperature between about 150° C. and 400° C., the time of chlorination and the amount of chlorine being sufficient to increase the reflectance of the sodium tripolyphosphate produced from said chlorinated sodium carbonate from less than 90 in the unchlorinated sodium carbonate to at least 90 and to decrease the foam index of said chlorinated sodium carbonate when mixed with phosphoric acid from over 50 in the unchlorinated sodium carbonate to below 50.

5. In the process for producing sodium carbonate produced by calcining sodium sesquicarbonate, said sodium sesquicarbonate being produced from crude trona, the improvement which comprises contacting said sodium sesquicarbonate with chlorine at temperatures between 150° C. and 250° C. during said calcining, the time of chlorination and the amount of chlorine being sufficient to increase the reflectance of the sodium tripolyphosphate produced from said chlorinated sodium carbonate from less than 90 in the unchlorinated sodium carbonate to at least 90 and to decrease the foam index of said chlorinated sodium carbonate when mixed with phosphoric acid from over 50 in the unchlorinated sodium carbonate to below 50.

6. In the process for producing sodium carbonate produced by calcining sodium sesquicarbonate, said sodium sesquicarbonate being produced from crude trona, the improvement which comprises contacting said sodium sesquicarbonate with chlorine at temperatures between about 150° C. and 250° C. during said calcining, about 0.18 part of chlorine being used per 100 parts of sodium sesquicarbonate.

7. A process for treating sodium carbonate produced from crude trona, said untreated sodium carbonate producing a sodium tripolyphosphate with a reflectance of about 72 and said untreated sodium carbonate giving a foam index when mixed with phosphoric acid of about 51 to 55, which comprises contacting aqueous solutions of said untreated sodium carbonate with gaseous halogen, said halogen selected from the group consisting of chlorine and bromine, the time of halogenation and the amount of halogen being sufficient to increase the reflectance of sodium tripolyphosphate produced from said treated sodium carbonate to about 91 to 95 and to decrease the foam index of said treated sodium carbonate when mixed with phosphoric acid to about 24 to 30.

References Cited in the file of this patent

UNITED STATES PATENTS

| 1,984,342 | Hellmers | Dec. 11, 1934 |
| 2,780,520 | Pike | Feb. 5, 1957 |
| 2,887,360 | Hokje | May 19, 1959 |

OTHER REFERENCES

Clabaugh et al. in "J. Res. Nat. Bur. Stand.," No. 1955, p. 261.

Mellor: "Comprehensive Treatise on Inorganic and Theoretical Chemistry," Longmans, Green and Co., N.Y., 1923, vol. 2, page 161; Supplement II, Part I, pages 686–687.